Figure 1:
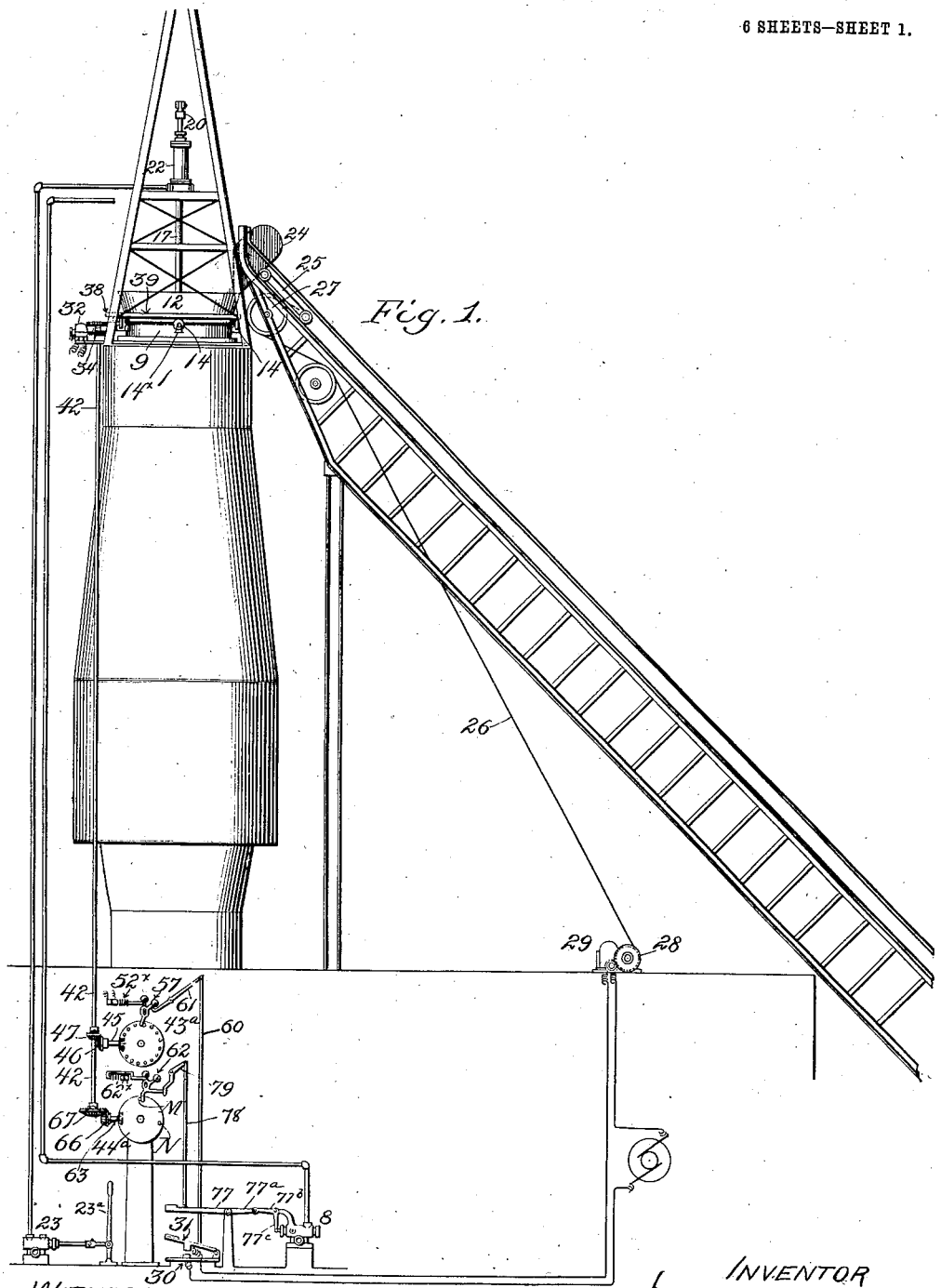

D. BAKER.
MECHANISM FOR CHARGING FURNACES.
APPLICATION FILED MAY 28, 1904.

No. 910,264.

Patented Jan. 19, 1909.

6 SHEETS—SHEET 1.

WITNESSES:

INVENTOR
David Baker
BY P. T. Dodge
ATTY.

D. BAKER.
MECHANISM FOR CHARGING FURNACES.
APPLICATION FILED MAY 28, 1904.

910,264.

Patented Jan. 19, 1909.
6 SHEETS—SHEET 2.

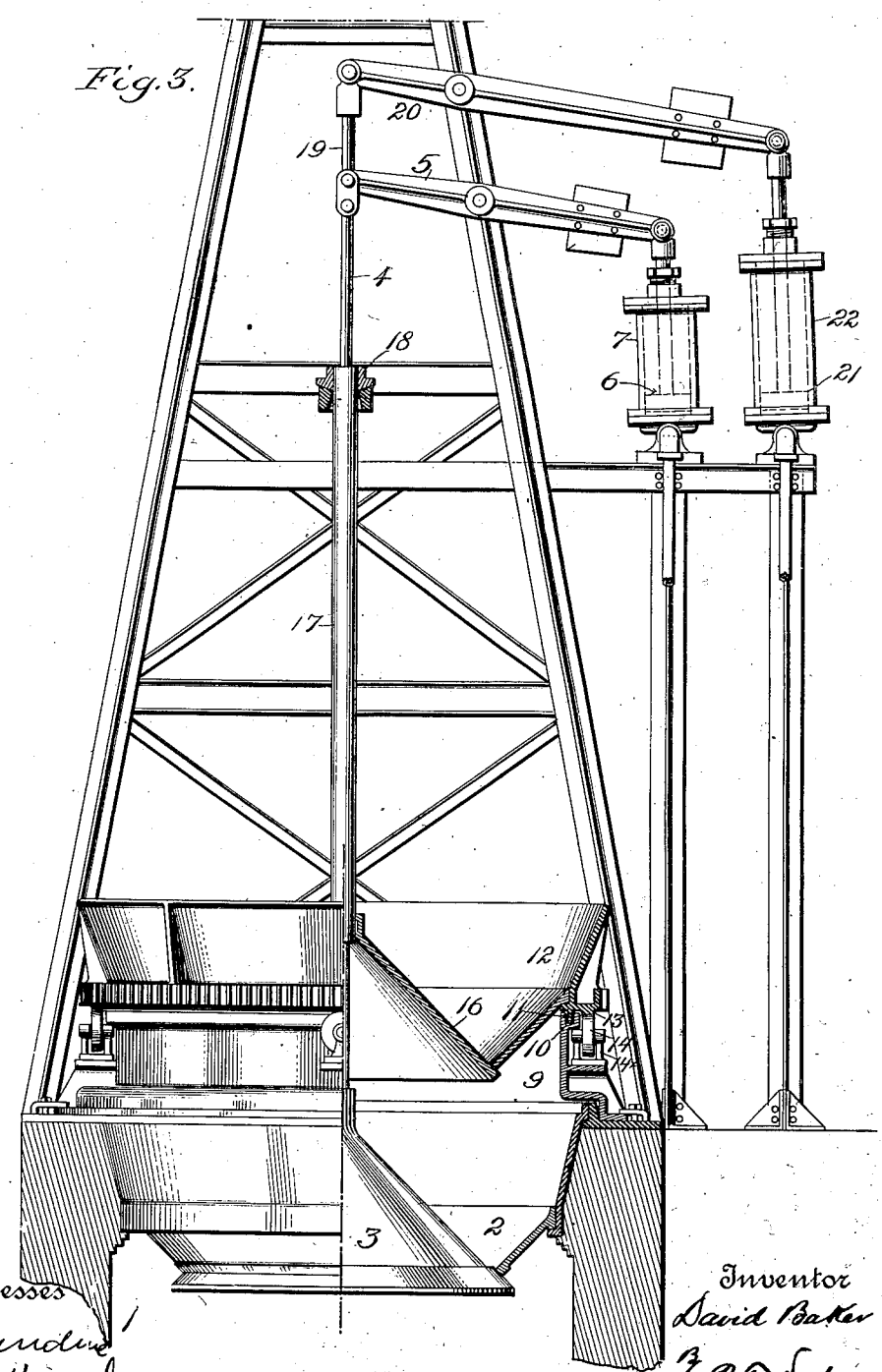

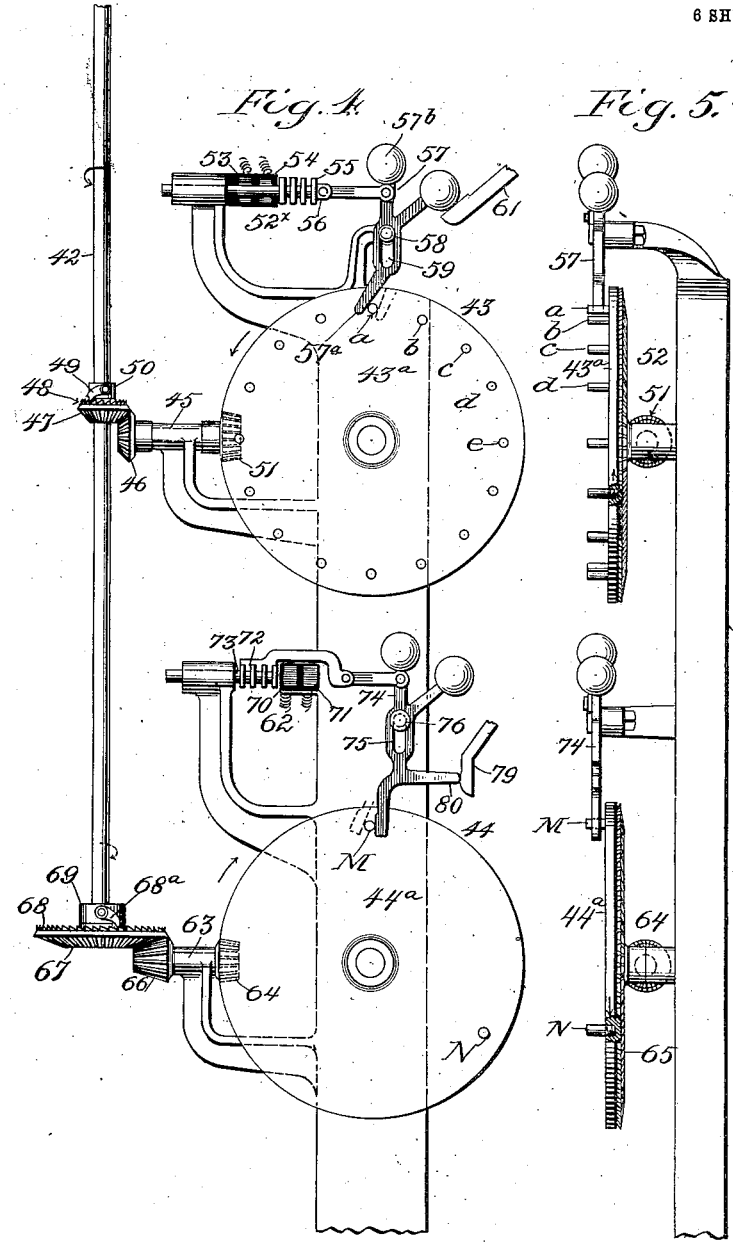

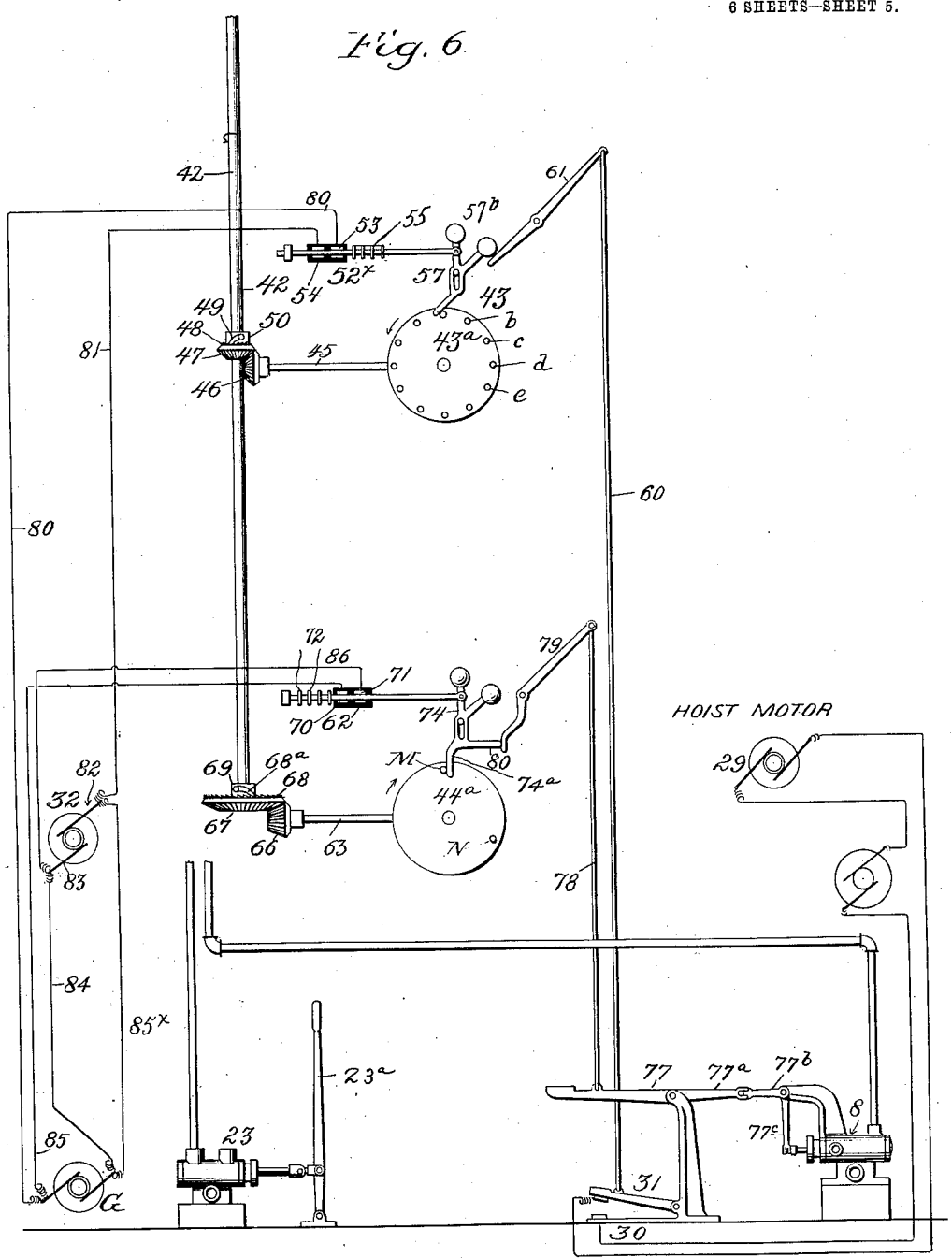

D. BAKER.
MECHANISM FOR CHARGING FURNACES.
APPLICATION FILED MAY 28, 1904.
910,264.
Patented Jan. 19, 1909.
6 SHEETS—SHEET 6.
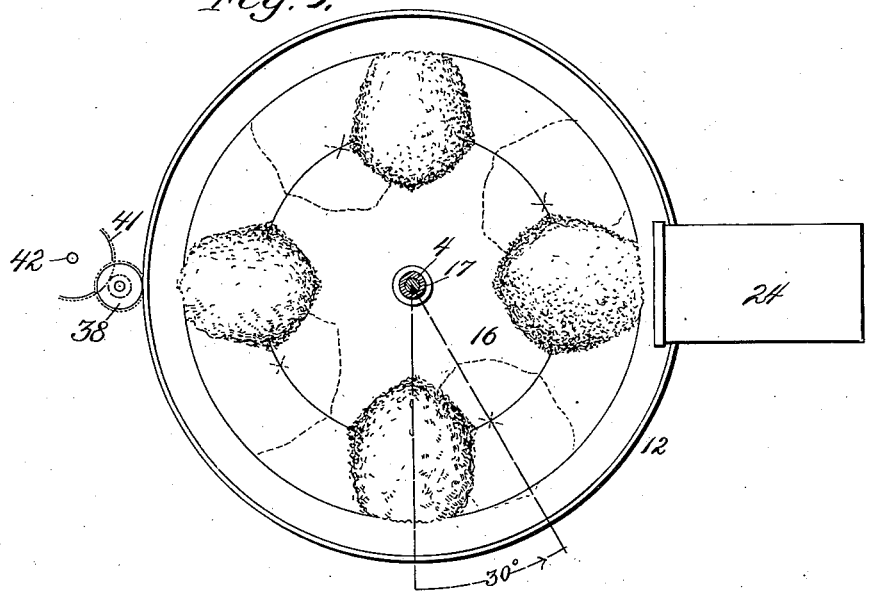
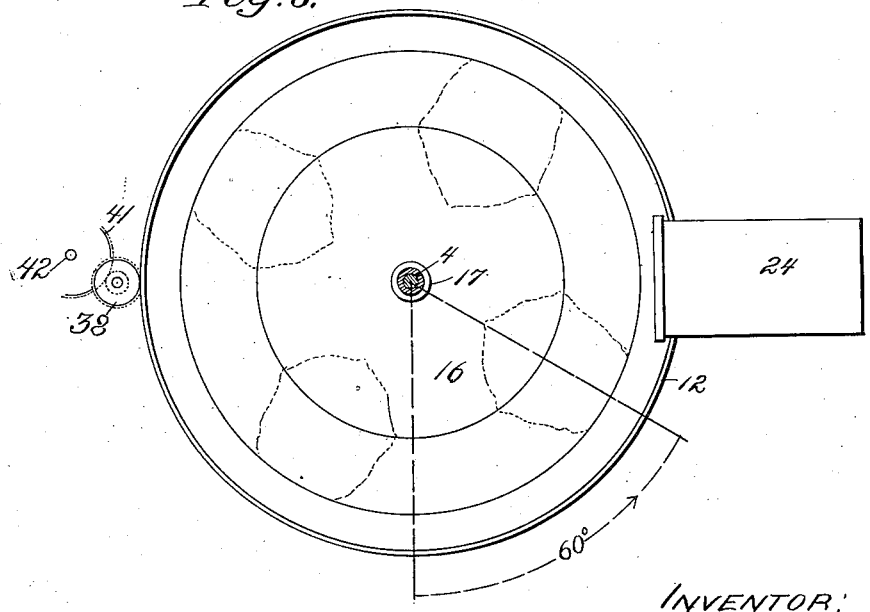
WITNESSES:
W. C. Bundine
A. M. E. Kennedy.
INVENTOR;
David Baker
BY P. T. Dodge
ATTY

UNITED STATES PATENT OFFICE.

DAVID BAKER, OF NEWTON, MASSACHUSETTS, ASSIGNOR TO THE BROWN HOISTING MACHINERY COMPANY, A CORPORATION OF OHIO.

MECHANISM FOR CHARGING FURNACES.

No. 910,264.  Specification of Letters Patent.  Patented Jan. 19, 1909.

Application filed May 28, 1904. Serial No. 210,269.

*To all whom it may concern:*

Be it known that I, DAVID BAKER, of Newton, county of Middlesex, and State of Massachusetts, have invented a new and useful Improvement in Mechanism for Charging Furnaces, of which the following is a specification.

In the practical operation of blast furnaces perhaps the greatest objection to be overcome is the tendency of the stock, such as limestone, ore, coke, &c., to sort and be distributed unevenly, resulting in irregular working, an inferior product, the early destruction of the lining of the furnace and ineffective action generally.

Under the earlier systems of charging the furnace by hand-barrows, where it was possible to dump the loads at predetermined points around the mouth of the hopper, and to arrange the different materials in the manner desired, a uniform and satisfactory distribution was attainable, although at the expense of considerable time and labor; and while on the introduction of the modern system of charging by skip hoists, the time and labor of the hand barrow system was saved, it has been at the sacrifice of uniform distribution, the absence of which has proved more expensive and objectionable as a final result than the saving of time and labor.

It is the aim of my invention to combine in a single system or organization, the time and labor saving features of the skip hoist system, and the uniformity of distribution of the hand barrow system; and my invention consists primarily in the combination with means for hoisting and dumping the materials of the charge, of a coöperating device for receiving the materials before they enter the furnace, and adapted to be actuated to dispose the materials or ingredients of the charge in certain predetermined relations to each other; and adapted also to dispose the different charges in certain predetermined relations to each other; whereby the charges may be distributed in the furnace in a uniform manner, and in the arrangement most favorable for regularity of working, the prolongation of the life of the furnace and effective action generally.

The device for receiving the materials before they enter the furnace and by which they are disposed in the proper predetermined relations, is preferably in the form of a rotary receiving hopper, arranged over the main hopper or throat of the furnace, which rotary hopper is actuated by controllable mechanism in such manner that while receiving the loads from the skip at a single point, it may be moved or adjusted to change the position of the deposited load with reference to the receiving point, so that the disposition of the loads may be readily controlled, and a distribution of the materials in the furnace effected in the manner desired.

The invention consists also in automatically operating mechanism for initiating the movement of the hopper and arresting the same at the proper predetermined points.

The invention consists also in mechanism operating to adjust the hopper, after it has received the materials at different points, so that when its contents are discharged, they may be caused to occupy in the furnace a predetermined position relatively to the materials previously charged.

The invention consists also in the details of construction and combination of parts hereinafter described and claimed.

Figure 2:
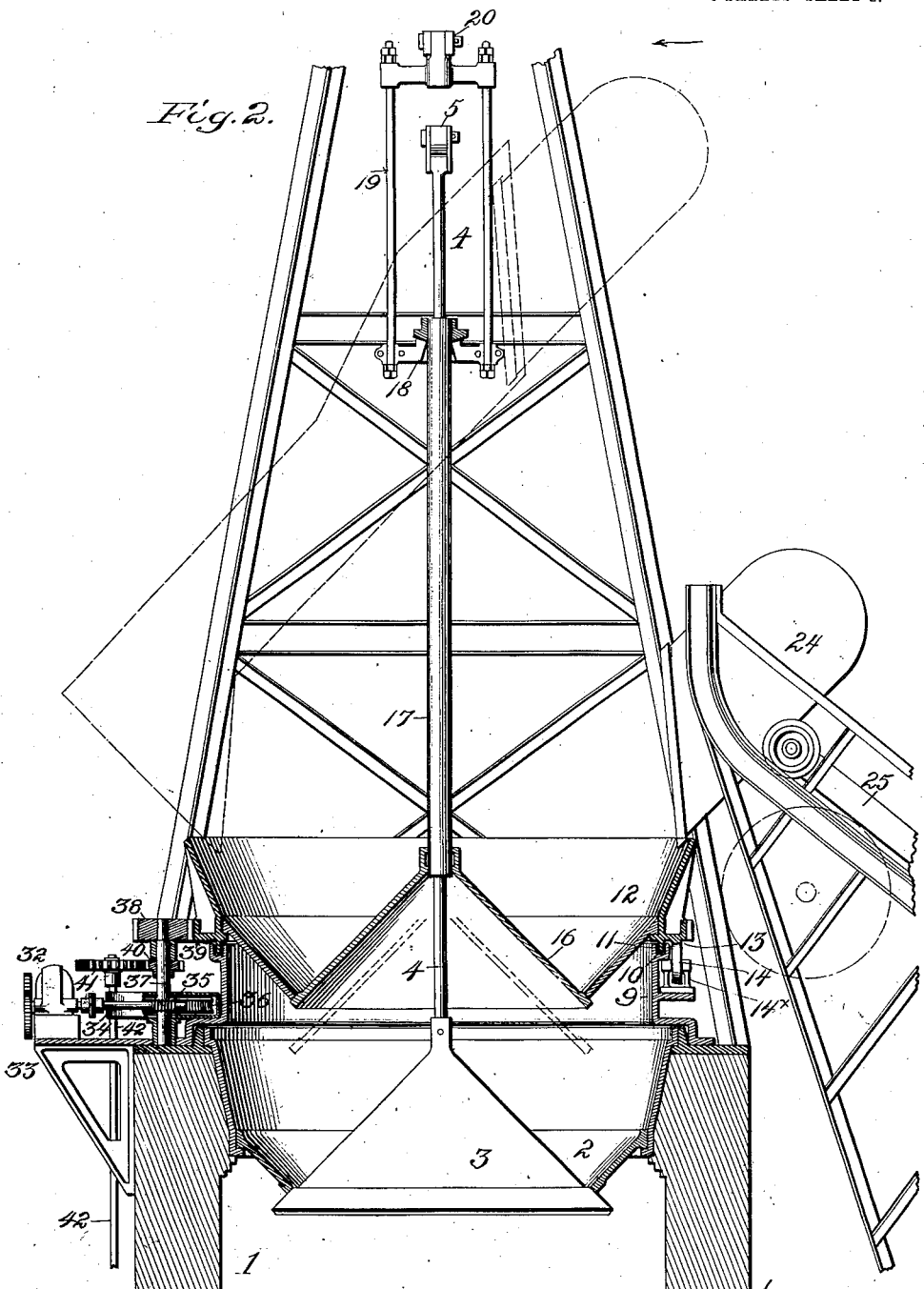

In the accompanying drawings: Figure 1 is a side elevation of a blast furnace having my invention applied thereto. Fig. 2 is a sectional elevation of the top of the furnace on an enlarged scale. Fig. 3 is a similar view looking in the direction of the arrow in Fig. 2. Fig. 4 is an enlarged view of the mechanisms for controlling automatically the movements of the rotary hopper. Fig. 5 is an edge view of the same. Fig. 6 is a view in the nature of a diagram, showing the relation and the connection of the various coöperating mechanisms and the electric circuits. Figs. 7 and 8 are diagrammatic views showing the distribution of the loads in the rotary hopper.

Referring to the drawings: 1 represents a blast furnace having at its top the usual main hopper 2 closed by a main distributing bell 3, suspended by a vertical rod 4, to the upper end of which is jointed a weighted operating lever 5 pivoted on the superstructure of the furnace and having connected with it a piston 6, working in a cylinder 7. The cylinder is supplied with air, steam or other actuating fluid from a suitable source, and is controlled by a valve 8.

Rising from the upper end of the main hopper and sustained by the top of the furnace, is a cylindrical throat 9 provided in its upper edge with a dust seal cavity 10 into which extends a depending rib 11 on the under side of a rotary hopper 12. The rotary hopper is formed with a horizontal supporting flange 13 resting on a series of supporting friction rollers 14 sustained by bearings 14ˣ, arranged at intervals around the outer side of the throat on horizontal supports projecting from the said throat. The relation of the parts is such that the rotating hopper is sustained free of the edge of the throat, with the rib terminating a slight distance above the cavity 10, which latter receives and becomes filled with the dust permeating the furnace gases, and in connection with the rib 11 forms an effectual seal, which while in the event of an explosion above the main bell, would relieve the sudden pressure and prevent injury to the parts, would soon become effective again by the accumulation of dust in the cavity. The lower part of the rotary hopper slopes downward and inward with its lower edge terminating within the throat 9, and it is closed by an auxiliary bell 16, movable up and down and also rotatable with the hopper. This auxiliary bell is suspended by a tubular stem 17 inclosing the stem of the main bell, and sustained at its upper end in a hanger 18 in such manner that it may loosely turn in the hanger so as to partake of the motion of the rotary hopper. The hanger 18 is connected by vertical links 19 with the inner end of a weighted actuating lever 20 pivoted to the superstructure of the furnace and having connected with its outer end a piston 21 working in a cylinder 22 supplied with air or steam or other actuating fluid from a suitable source and controlled by valve 23.

The materials to be charged into the furnace are hoisted by skip cars 24 traveling on an inclined track 25, leading from the base of the furnace, to which cars are connected a hoisting cable 26 passing over a guide pulley 27, at the top of the superstructure, thence to a winding drum 28 near the base of the furnace, which drum is preferably actuated by an electric motor 29 controlled by a switch 30, operated by lever 31. The skip cars are preferably arranged to dump directly into the hopper at the side as shown, but for certain forms of furnaces, the cars may be arranged to dump higher up into the upper end of a long chute, shown by dotted lines in Fig. 2, extending diagonally downward across the superstructure with its discharge end terminating at the upper edge of the hopper.

The movements of the rotary hopper may be effected by any suitable power mechanism controllable in its action so as to adjust the hopper to the different positions desired, but I prefer to employ an electric motor 32 for this purpose, for the reason that it will give more perfect control of the hopper, and will enable me to more readily effect and control the automatic operation of the same, and will permit of the coöperation with the bell operating and other mechanisms.

The motor 32 as shown in Figs. 1 and 2 is supported at the top of the furnace to one side, on a bracket 33, and receives its current from a generator G which may be situated at any convenient location. The armature shaft 34 of the motor is provided with a worm 35 engaging a horizontal worm wheel 36 on a vertical shaft 37, to the upper end of which a driving pinion 38 is fixed in position to engage a circumferential rack 39 on the rotary hopper. Beneath pinion 38, the shaft has fixed to it a smaller pinion 40 engaging a gear wheel 41 on the upper end of a vertical pilot shaft 42 which extends downward to the base of the furnace, where are situated the automatic controlling mechanisms shown particularly in Figs. 4, 5 and 6 and now to be described. The controlling mechanisms comprise two devices 43 and 44 both actuated by the pilot shaft 42, one of which devices, 43, serves to arrest automatically the advance of the hopper after it has proceeded a predetermined distance, while the other device 44 acts to automatically arrest the motion of the hopper after it has moved in a reverse direction for a predetermined distance. The purpose of the first device is to control the movements of the hopper, so that the material dumped by the skip cars will be arranged at equal intervals around the hopper, and this is accomplished by moving the hopper a predetermined distance after the deposit of each load from the skip car, the controlling device acting to automatically arrest the hopper at the proper point after each advance movement. The purpose of the other controlling device 44 is to govern the movement of the hopper, so that after it has received the different dumps of the skip car at intervals under the control of the first device, it may be operated to change the relation of the entire load with reference to those previously entering the furnace, which is effected by turning the hopper with its dumps in a reverse direction, the controlling device 44 acting to arrest the same at the proper point.

The controlling device 43 consists of a vertical rotary disk 43ᵃ driven in one direction from the pilot shaft, through the medium of a counter shaft 45 having fixed to one end a bevel gear 46 engaged by a bevel pinion 47 loose on the pilot shaft and formed with ratchet teeth 48 adapted to be engaged by a driving dog 49 on a sleeve 50 fixed to the pilot shaft, the arrangement being such that the driving dog will become effective and the gear 47 will be rotated with the shaft, when the latter is moved in one direction only as indicated by the arrow, the reverse movement of the shaft causing the dog to ride over the ratchet teeth without moving the gear. The opposite end of the counter shaft is provided with a bevel gear 51 engaging bevel teeth 52 on the rear face of the disk. The disk has projecting from its front face a series of actuating pins $a$, $b$, $c$, $d$, $e$, &c., extending in a circle around the same at equal distances apart, which pins are adapted to engage and open a switch $52^x$, controlling motor 32, so that when the switch is closed and the motor operates, the rotary hopper will be turned and motion will be imparted by the pilot shaft to the disk 44, which will be rotated in the direction of the arrow until one of the actuating pins engages the switch, whereupon the latter will be opened and the hopper and disk will come to a rest.

The switch $52^x$ comprises two terminals 53 and 54 adapted to be electrically connected in the motor circuit by contact fingers 55 on a movable slide 56 jointed to a weighted lever 57 provided with a finger $57^a$ extending normally in the path of the pins of the disk, which lever is adapted to be rocked on a fixed pivot pin 58 extending through a slot 59 in the lever, so that in addition to its rocking motion to close and open the switch, the lever may be lifted on its pivot in order to allow its depending finger $57^a$ to be lifted over the actuating pin (which last engaged it) when the lever is rocked to close the switch.

In the present instance the form and relation of the gear for rotating the hopper and that for turning disk $43^a$, are such that the disk will make one-quarter of a revolution, while the hopper is making a full turn, and the actuating pins are so spaced on the disk that the hopper will be arrested at each quarter turn, with the result that the skip loads will be deposited respectively at four equally spaced points in the hopper. It is obvious, however, that these relations of the parts may be variously modified to meet the varying conditions encountered in practice as regards the character and number of the ingredients composing a complete charge, the size of the hopper, &c.

The operation of the mechanism thus far described, is as follows: Assuming that the parts are in the position shown in the drawings with the switch $52^x$ for the hopper motor open, switch 30 for the hoist motor open, with said mechanisms at rest, and finger $57^a$ of switch lever 57 in the path of actuating pin $a$ (by which it has just been moved to throw the switch lever and open the switch); the operator depresses lever 31, thereby closing hoist motor switch 30, and hopper motor switch $52^x$, which latter action is effected through the medium of a rod 60 jointed at its lower end to lever 31 and at its upper end to one end of a vibrating lever 61 whose opposite end is in position to engage a weighted head $57^b$ on the switch lever, the arrangement being such that on the depression of lever 31 the vibrating lever 61 acting on the head $57^b$ will rock switch lever 57 on its pivot pin, and will at the same time lift it bodily and carry the projecting finger $57^a$ over actuating pin $a$ simultaneously sliding contact fingers 55 onto terminals 52 and 53. The two motors now being in circuit, the hopper begins to revolve, the disk $43^a$ to turn, and the loaded skip car to ascend, and these motions continue until actuating pin $b$ engaging finger $57^a$ throws the switch lever to its former position, which action will open switch $52^x$, and the weighted head $57^b$ engaging vibrating lever 61 will pull upward on rod 60 and open hoist motor switch 30. The hopper now comes to rest, and the skip dumps its load into the same. Lever 31 is again depressed, and the foregoing operations being repeated, the hopper is moved another quarter turn and is stopped by pin $c$, and then receives a second skip load at a distance from the first corresponding to the travel of the hopper, it being understood that in the meantime the empty skip has descended and a loaded skip has been hoisted to furnish the second load. On the third actuation of the lever 31, the hopper is advanced a further quarter turn and receives its third dump from the skip, being arrested by pin $d$; and on the fourth actuation of the lever the hopper is advanced to complete its circuit, being stopped by pin $e$ and receives its fourth dump from the skip. The auxiliary bell 16 closing the rotary hopper is now opened by the actuation of valve 23 by lever $23^a$, and the contents of the hopper descend into the main hopper onto the main bell. The operations above described are now repeated, and the rotary hopper is again filled with four dumps from the skips, but before these dumps are discharged into the main hopper, the main bell is opened to discharge the contents of the main hopper into the furnace, and simultaneously, by the mechanism presently to be described, the rotary hopper with its second load is turned back a predetermined distance so as to change the relation of the four dumps therein, to those just discharged into the furnace from the main hopper, to the end that when the second hopper load enters the furnace, the spaced dumps will not fall directly on those already in the furnace and occupy the same positions. By this manner of charging the furnace, if the first hopperful is made up of four skip loads of coke, and the second hopperful is made up of four skip loads of mixed limestone and ore, when the two hopperfuls finally reach the interior of the furnace, the individual dumps of the second hopperful may be caused to occupy the spaces between the individual dumps of the first hopperful, provided the hopper with the second load has been turned back the proper distance; or by changing the extent of reverse movement of the hopper, the second hopperful may be caused to occupy other relations as to the material in the furnace.

I prefer, in a case similar to the present, where there are four dumps required to fill the hopper, and where the hopper is filled first with four dumps of coke, and then with four dumps of mixed lime and ore, which makes one complete furnace charge, to turn the hopper back at the first operation, that is when the first hopperful enters the furnace, 30°, and at the second operation, when the second hopperful enters the furnace onto the first, the hopper is turned back 60°; and at the third operation 30°, and then 60°, and so on, the effect being to divide, as it were, the four dumps in the hopper into twelve, thus effectually eliminating any tendency of the lumps to form a "chimney" in the furnace, which would occur if the successive hopperfuls were introduced into the furnace, with the individual dumps on top of those preceding.

The controlling device 44, which as before stated, governs the reverse movement of the hopper, consists of a switch 62 adapted, when closed, to reverse the motion of motor 32, and a rotary disk 44$^a$ driven from the pilot shaft in a direction opposite disk 43$^a$, and provided with actuating pins M and N serving to open the switch automatically and arrest the motion of the hopper when the latter has moved backward a predetermined distance, according to the location of the pins. The disk 44$^a$ is driven from the pilot shaft through the medium of a counter shaft 63 provided at one end with a pinion 64 engaging gear teeth 65 on the rear face of the disk, and having fixed to its opposite end a bevel pinion 66 meshing with a bevel gear 67 loose on the pilot shaft, and formed with ratchet teeth 68 engaged in one direction only by a driving dog 68$^a$ on a collar 69 fixed to the shaft. The arrangement is such that when the shaft is rotated in a reverse direction, as indicated by the arrow in dotted lines, the dog will engage the ratchet teeth on pinion 67 and will impart the motion of the shaft to the same, and drive disk 44$^a$ in a direction opposite the other disk 43$^a$; but if the pilot shaft is rotated in the other direction the dog will not engage the teeth with a driving action but will slip over the same. The switch 62 consists of two terminal points 70 and 71, which are so connected with the motor circuit, as will be more fully described hereinafter, that when they are electrically connected by contact fingers 72 on a slide 73, the current from the generator will pass in a reverse direction through the motor with reference to the direction of the current through switch 52$^x$, with the result that the motor will turn backward and will impart a corresponding movement to the hopper. Slide 73 carrying the contact fingers is jointed near the upper end of a weighted switch lever 74 slotted as at 75 and mounted to lift and rock on a fixed pivot pin 76. At its lower end the lever is provided with a finger 74$^a$ extending in the path of the actuating pins M and N, so that when engaged by said pins the lever will be rocked and moving the contact fingers free of the terminals the switch will be opened.

The closure of the switch is effected by a lever 77 connected by a vertical rod 78 with a vibrating arm 79, whose end is adapted to engage a horizontal arm 80 projecting from the switch lever 74 at a point below its pivot pin, which vibrating arm, when lever 77 is depressed, will rock the switch lever 77 on its pivot and at the same time will lift its finger 74$^a$ over actuating pin M (which has just engaged the finger and opened the switch,) leaving the finger in the path of the next actuating pin, ready to be operated by said pin to rock the switch lever and open the switch.

As before stated the reverse movement of the hopper is initiated simultaneously with the opening of the main bell when the first hopperful is discharged into the furnace, and in order to effect this action the switch operating mechanism and the mechanism for operating the main bell are connected in such manner that when lever 77 is depressed to reverse the movement of the hopper, it will also actuate controlling valve 8 and admit pressure to cylinder 22 operating the main bell. The connection of these mechanisms is illustrated in Fig. 6 where it will be seen that lever 77 is provided with an extension or arm 77$^a$ connected by links 77$^b$ with a crank arm 77$^c$ on the stem of valve 8, the arrangement being such that when lever 77 is depressed to reverse the hopper, valve 8 will be turned and will admit pressure to cylinder 22 and the main bell will be lowered; and when the lever 77 77 is raised on the rocking of the switch lever by the actuating pin to open the switch and arrest the motion of the hopper, the valve will be turned to cut off the pressure and open the cylinder to the atmosphere, allowing the cylinder to exhaust, and weighted lever 20 to return the bell to its former closed position.

By the coöperation of the mechanisms described in the manner set forth, the successive operations of lever 31 will act to rotate the hopper intermittently and will cause the skips to deposit their contents at equal intervals therein; while the operation of lever 23$^a$ will deposit the contents of the hopper into the main hopper. The further operations of lever 31 as before, will again rotate the hopper intermittently to receive its several dumps, and lever 77 being actuated the hopper will be turned back with its load, and at the same time the main bell will be opened and the first hopper load will pass into the furnace, the actuating pin on disk 44ᵃ arresting automatically the movement of the hopper at the proper point and closing the main bell. Lever 23ᵃ being operated, the contents of the hopper will enter the main hopper, whereupon the rotary hopper being again filled as before by the actuation of lever 31, lever 77 is operated, resulting in the reverse movement of the hopper a further distance, and the discharge of the contents of the main hopper into the furnace in its changed relation to the first load entering the furnace, and so on, each load as it enters the furnace, occupying a different relation as regards the position of the load as a whole, to the preceding one.

It will be observed that I am enabled to distribute the skip loads in the hopper in the order desired, notwithstanding the fact that they are discharged from the skip at a single unchanging point; and I am also enabled to vary and control the distribution of the successive hopper loads in the furnace and arrange them with relation to each other in the order desired and in a uniform and regular manner. I thus combine in my improved mechanism, the uniformity of distribution of the old hand barrow system, with the time and labor saving advantages of the skip hoist system, and this by automatically operating mechanism under the perfect control of the attendant.

While I have shown and described the actuating pins on the two disks spaced apart in a certain definite manner, it is obvious that their arrangement may be varied and changed by making the pins removable and by providing additional holes to receive them, so that by changing the pins in position the hopper may be caused to travel different distances, both when advancing to receive the loads from the skip, and when reversing to turn the entire load backward.

The arrangement of the circuits by which the hopper motor is controlled by switches 52ˣ and 62, is illustrated in the diagrammatic view, Fig. 6, where it will be seen that the current from the generator G passes by conductor 80 to terminal 53 of switch 52ˣ, thence from terminal 54 by conductor 81 to commutator brush 82 of motor 32, thence through the motor and out by brush 83 to conductor 84 and again to the generator, which will rotate the motor so as to advance the hopper to receive the skip loads at intervals, which motion of the motor will rotate the pilot shaft, as shown by the full line arrow, and turn disk 43ᵃ as indicated by the arrow, and this without affecting the other disk.

The circuit controlled switch 62 for reversing the motor, starting at generator G passes by conductor 85 to terminal 70 of switch 62, and thence from terminal 71 by conductor 86 to commutator brush 83 of motor 32, and thence through the motor in a direction reverse to the other circuit, leaves the same by brush 82, and returns to generator by conductor 85ˣ. By this current the motor being reversed, the hopper will be turned back and imparting to the pilot shaft a reverse motion (which will not affect disk 43ᵃ) disk 44ᵃ will be turned in the direction of the arrow to bring its actuating pins into action to operate the switch lever.

It will be observed that from the construction illustrated and described, the rotary hopper is of a capacity sufficient to hold a number of skip loads or as is termed "portions" of the charging material, and that the hopper is advanced intermittently to predetermined points, so that the skip loads will be deposited in corresponding positions in the hopper. In these deposited relations the contents of the hopper are discharged as a single operation. That is, when the bell is opened the contents of the hopper fall in the main hopper with the ingredients, or skip loads in the same relations that they occupied in the rotary hopper, and from the main hopper when the main bell is lowered, the contents pass into the furnace, still occupying, as far as the individual portions are concerned, the same relations. This construction is to be distinguished from those where the charging material passes into the furnace through a spout, in which case while the spout may be advanced to discharge each individual skip load at a predetermined point in the furnace, it cannot be operated to deposit a mass of material into the furnace with the different portions distributed as desired and in the positions they occupied after being deposited in the receiving hopper.

Having thus described my invention, what I claim is:

1. In a furnace charging mechanism, the combination of a receptacle, means for depositing portions of the charging material at intervals therein, means for shifting the position of said deposited material as a whole, and means for introducing the same in their shifted position into the furnace.

2. In a furnace charging mechanism, the combination with a receiving receptacle, of means for depositing the charging material at intervals therein, means for shifting the position of said deposited material without changing the individual relations, and means for discharging the same in their shifted position into the furnace.

3. In a furnace charging mechanism, the combination with a receiving receptacle, of means for depositing portions of the charging material therein at intervals, means for discharging said materials in their deposited relations simultaneously into the furnace, means for depositing additional portions of the charging material at intervals in the receptacle, means for changing the relation of the same as a whole with reference to those in the furnace, and means for discharging the additional charging material into the furnace in its changed relation.

4. In a furnace charging mechanism, the combination with a rotary receiving hopper, of means for moving the same intermittently to receive portions of the charging material at intervals, means for moving said hopper a predetermined distance after the deposit of the material, in order to change the position of the hopper load as a whole, and means for depositing the hopper load in the furnace with the portions of the charge in the relations they occupied in the receiving hopper.

5. In a furnace charging mechanism, the combination with a rotary hopper, of means for moving the same intermittently to receive portions of the charge at intervals, means for moving said hopper in a reverse direction to shift the position of the load as a whole, and means for discharging the same into the furnace in its shifted position.

6. In an organized mechanism for charging furnaces, the combination with means for conveying portions of the charging material at intervals to the top of the furnace, of a rotary receiving hopper of a capacity to receive and hold a plurality of said portions, a closure for said hopper, means for moving said hopper at intervals to predetermined positions to receive portions of the charging materials at intervals therein, a main fixed hopper below the rotary hopper adapted to receive the contents of the rotary hopper, and a closure controlling the communication of the main hopper with the interior of the furnace.

7. In a furnace charging mechanism, the combination with a rotary hopper, of actuating mechanism therefor adapted to advance the hopper, means for initiating the action of said mechanism, means for automatically arresting the motion of the same when the hopper has advanced a predetermined distance, mechanism for reversing the movement of the hopper, means for initiating the action of said reversing mechanism, and means for automatically arresting the motion of the hopper after it has moved a predetermined distance.

8. In a furnace charging mechanism, the combination with a main hopper and a closure for the same, of operating means for said closure, a rotary receiving hopper above the main hopper, a closure for the receiving hopper controlling the discharge of the contents of the same into the main hopper, means for depositing portions of the charging material at intervals in the rotary hopper, mechanism for shifting the hopper with its deposited load, and connections between said mechanism and the main hopper closure-operating means, said connections formed to cause the rotary hopper to be shifted when the main hopper closure is opened.

9. In a furnace charging mechanism the combination with a hoisting device for the charging material, of operating mechanism therefor, a rotary receiving hopper, independent actuating mechanism for the same, a device for initiating the action of the said independent actuating mechanism, and connections between said initiating device and the hoist operating mechanism, said connections being formed to cause the hoist mechanism to operate when the action of the hopper mechanism is initiated.

10. In a furnace charging mechanism the combination of a rotary hopper, actuating mechanism therefor, adapted to advance the hopper, a controlling device for automatically arresting the motion of the hopper when it has advanced a predetermined distance, a hoist device for the charging materials, operating mechanism for the same, and connections between the controlling device and hoist operating mechanism, acting to automatically arrest the motion of the hoist mechanism when the controlling device operates to stop the hopper.

11. In a furnace charging mechanism the combination of a rotary hopper, means for depositing portions of the charging material at intervals therein, mechanism for shifting the position of the hopper with its deposited load, a controlling device for said mechanism, acting to arrest the hopper when it has been shifted a predetermined distance, a main hopper, a closure for the same, an operating device for said closure, and connections between said operating device and said controlling device, said connections being formed to cause the closure to be automatically closed when the controlling device acts to arrest the hopper.

12. In a furnace charging mechanism the combination with a rotary hopper, of actuating mechanism therefor, a controlling device for said actuating mechanism operatively connected with and driven by it and formed to automatically arrest the motion of the hopper at predetermined points in its rotation.

13. In a furnace charging mechanism the combination with a rotary hopper, of actuating mechanism therefor, a controlling device for said actuating mechanism formed to automatically arrest the motion of the hopper at predetermined points in its rotation, and means for varying the points at which the hopper will be stopped.

14. In a furnace charging mechanism, the combination with a rotary hopper, of actuating mechanism therefor, a movable controlling member adapted when in one position to initiate the action of the hopper mechanism, and when in another position to arrest the motion of said mechanism, a traveling device operatively connected with the hopper actuating mechanism and provided at intervals with means adapted to engage the movable controlling member and to shift the same to position to arrest the motion of the hopper mechanism, and means for shifting said member to its other position to initiate the action of the hopper mechanism.

15. In a furnace charging mechanism the combination with a rotary hopper, of actuating mechanism therefor, a movable controlling member adapted when in one position to initiate the action of the hopper mechanism and when in another position to arrest the motion of said mechanism, a rotary disk operatively connected with the hopper actuating mechanism and provided at intervals with actuating pins adapted to engage the movable member and shift the same to position to arrest the motion of the hopper mechanism.

16. In a furnace charging mechanism the combination with a rotary hopper, of actuating mechanism therefor, a movable controlling member adapted when in one position to initiate the action of the hopper mechanism and when in another position to arrest the motion of said mechanism, a rotary disk driven from the hopper mechanism and provided at intervals with actuating pins adjustable in position on the disk, said pins being adapted to engage the movable member and shift the same to position to arrest the motion of the hopper mechanism.

17. In a furnace charging mechanism the combination with a rotary hopper, of operating mechanism therefor reversible in its action to turn the hopper forward or backward, a controlling device operatively connected with the hopper operating mechanism and adapted to control its forward motion, and a second controlling device operatively connected with the hopper actuating mechanism and adapted to control its backward movement, said controlling devices being independent of each other in their actions.

18. In a furnace charging mechanism the combination with a rotary hopper, of an electric motor therefor, operative gearing between the motor and the hopper, a generator, a switch, a circuit including the switch, motor and generator and leading the current through the motor in one direction, a switch lever, means for actuating the switch lever to close the switch, means controlled by the movement of the hopper mechanism for automatically actuating the switch lever to open the switch when the hopper has advanced a predetermined distance, a second switch, a second circuit including the switch, the generator and motor, and leading the current through the latter in a direction reverse to the first mentioned circuit, a switch lever for the second switch, means for actuating said lever to close the switch, and means controlled by the reverse movement of the hopper mechanism, for actuating the second switch lever to automatically open the switch when the hopper has moved to a predetermined position.

19. In a furnace charging mechanism the combination with a rotary receiving hopper, of mechanism for rotating the same forward, means for initiating said action, means for automatically arresting the hopper at a predetermined point after each advanced movement, means for turning said hopper backward, means for initiating said action, and means for automatically arresting the hopper when it has turned backward to a predetermined point.

20. In a furnace charging mechanism the combination with a rotary receiving hopper, of mechanism for rotating the same forward, means for initiating said action, means for automatically arresting the hopper at a predetermined point after each advance movement, means for turning said hopper backward, means for initiating said action, and means for automatically arresting the hopper when it has turned backward to a predetermined point, said means for arresting the hopper at predetermined points being variable at will in their actions.

21. In combination with a furnace, means for conveying portions of the charging materials at intervals to the top of the same, a rotary receiving hopper of a capacity to receive and hold a plurality of said portions of charging materials, a closure for said hopper, means for moving the hopper at intervals to receive portions of the charging materials at different positions therein, and means for operating the closure to simultaneously discharge said portions of charging materials into the furnace.

22. In combination with a furnace, a rotary receiving receptacle having a controllable communication with the interior of the furnace, and adapted to receive and hold a plurality of skip loads of charging materials, means for introducing the skip loads successively into the receptacle, means for giving the receptacle successive partial turns so as to distribute the loads therein at successive points, and means for operating the closure to simultaneously discharge said loads of charging materials into the furnace.

23. In combination with a furnace, a rotary receiving hopper, a vertically movable closure device for the same adapted to confine the charging materials therein temporarily, means for introducing the charging materials into the receiving hopper from a single unchanging point, means for turning the hopper to different positions, a fixed main hopper beneath the receiving hopper, and a closure device controlling the communication of said main hopper with the interior of the furnace.

24. In combination with a furnace, a rotary receiving hopper, a main fixed hopper below the receiving hopper, a closure device controlling the communication of the main hopper with the interior of the furnace, a closure device for the receiving hopper adapted when in closed position to confine the charging materials therein, and arranged when opened to permit the contents of the receiving hopper to pass therefrom at all points in its circumference and be evenly distributed in the main hopper, means for introducing the charging materials into the receiving hopper, and means for turning the receiving hopper to different positions.

25. In a blast furnace charging apparatus, the combination of a furnace top, a receptacle fixed in said top and having an opening communicating with the interior of the furnace, a bell for controlling said opening, a second receptacle mounted and rotatable above the first and provided with an opening communicating therewith, and a bell for controlling said last named opening and normally closing the same.

26. In a furnace charging mechanism, the combination of a plurality of separately movable parts, separate motive devices for operating said parts, means for initiating the action of said motive devices, and means controlled by the operation of one of said parts for arresting automatically the operation of both motive devices.

27. In a furnace charging mechanism, the combination of a rotary hopper, a motive device for operating the same, a hoist mechanism, a motive device for operating the hoist mechanism, means for initiating the action of said motive devices, and means controlled by the operation of one of said motive devices for automatically arresting the action of both.

28. In a furnace charging mechanism, the combination of a rotary hopper, an electro-motor for operating the same, a hoist mechanism, an electro-motor for operating the hoist mechanism, a switch controlling the circuit of the hopper-motor, a second switch controlling the circuit of the hoist-motor, connections between said switches whereby the closing of one switch will automatically close the other and initiate the action of both motors, and a controlling device operated by the hopper-motor and adapted to automatically open the switches after the hopper has turned a predetermined distance.

In testimony whereof I hereunto set my hand this 20th day of May, 1904, in the presence of two attesting witnesses.

DAVID BAKER.

Witnesses:
J. L. POULTNEY,
LILLIAN M. HUDNUT.